(12) United States Patent
Rosen et al.

(10) Patent No.: US 6,416,432 B1
(45) Date of Patent: Jul. 9, 2002

(54) COMPOSITE SPORTS RACKET

(75) Inventors: B. Walter Rosen, Blue Bell; Anthony A. Caiazzo, Boalsburg, both of PA (US)

(73) Assignee: Structured Composites, LP, Merion Station, PA (US)

( * ) Notice: Subject to any disclaimer, the term of this patent is extended or adjusted under 35 U.S.C. 154(b) by 0 days.

(21) Appl. No.: 09/564,892

(22) Filed: May 4, 2000

Related U.S. Application Data

(63) Continuation-in-part of application No. 09/562,546, filed on May 2, 2000.

(51) Int. Cl.$^7$ ............................... B32B 5/02; F16F 1/14
(52) U.S. Cl. ........................................ 473/524; 428/357
(58) Field of Search ........................... 428/357; 473/524

(56) References Cited

U.S. PATENT DOCUMENTS

| | | | |
|---|---|---|---|
| 4,983,242 A | 1/1991 | Reed | |
| 5,203,435 A | * 4/1993 | Dolgin | 188/322.5 |
| 5,374,057 A | 12/1994 | Lai et al. | |
| 6,048,426 A | * 4/2000 | Pratt | 156/177 |
| 6,117,029 A | 9/2000 | Kunisaki et al. | |
| 6,155,932 A | 12/2000 | Cabales et al. | |

* cited by examiner

Primary Examiner—Cynthia H. Kelly
Assistant Examiner—Kimberly Nguyen
(74) Attorney, Agent, or Firm—Buchanan Ingersoll P.C.; Robert A. Koons Jr., Esq.; Matthew P. McWilliams

(57) ABSTRACT

A sports racket comprising a frame made of an energy absorbing structural laminate. The structural laminate comprises: (a) a first layer of composite material comprising $x_1$ plies; wherein at least $0.5x_1$ plies contain fibers arranged in a shape of a continuous curve; wherein said continuous curve is the same or different in different plies; (b) a second layer of composite material comprising $x_2$ plies; wherein at least $0.5x_2$ plies contain fibers arranged in a shape of a continuous curve; wherein said continuous curve is the same or different in different plies; and (c) a viscoelastic layer disposed between the first and second layers such that shear strains are substantially distributed throughout the viscoelastic layer when a load is applied to the structural laminate.

27 Claims, 8 Drawing Sheets

Section of Sports Racquet

Section of Sports Racquet $(+\alpha°/-\beta°)$ are angles of straight fibers relative to beam axis.
(Subscripts denote number of repetitions)

Configuration 2A – 1/4 Wavelength Phase Shift
Configuration 2B – 1/2 Wavelength Phase Shift

COMPOSITE SPORTS RACKET

This is a continuation-in-part of the copending application titled "Energy Absorbing Structural Laminate," Ser. No. 09/562,546, filed May 2, 2000.

STATEMENT REGARDING FEDERALLY SPONSORED RESEARCH

The U.S. Government has a paid-up license in this invention and the right in limited circumstances to require the patent owner to license others on reasonable terms as provided for by the terms of Grant No. DMI-9402898 awarded by the National Science Foundation.

BACKGROUND OF THE INVENTION

1. Field of the Invention

The present invention relates to a sports racket, such as a tennis, racquetball, squash or badminton racket comprising a frame of a structural laminate having desirable vibration damping and stiffness properties.

2. Related Background Art

The ability to dissipate vibrational energy is an important characteristic of sports rackets. Vibrational modes are present in both the racket frame and the strings, and there have been numerous approaches to damping these vibrational modes. U.S. Pat. No. 4,983,242 to Reed describes a tennis racket made from a tubular member having a layer of viscoelastic material sandwiched between inner and outer layers of fiber-reinforced resin. U.S. Pat. No. 5,374,057 to Lai et al. describes a racket that is made from either a solid or a tubular frame, and which has a damping element secured to either the inside or outside surface of the frame. Neither of these references contains any disclosure of the use of curved fibers, or of the importance of fiber orientation in controlling stiffness and damping properties of structural laminates.

General applications of viscoelastic materials to attenuate noise and vibration in passive damping devices are well known, as disclosed for example in U.S. Pat. No. 3,079,277. Sandwiching elastomeric layers between non-elastomeric layers to produce a vibration-damping laminate is also known, as disclosed in U.S. Pat. No. 4,278,726. The use of opposing fiber orientations to obtain damping in combination with a spring is disclosed in U.S. Pat. No. 3,892,398.

In all of these devices, noise and vibrational energy is damped through development of internal shear stresses in the viscoelastic material. The damping efficiency increases with the amount of internal shear developed. With the exception of U.S. Pat. No. 3,892,398, in which a spring provides energy absorption, damping is produced through tension-tension coupling between the elastomeric and the non-elastomeric layers, resulting in shear development in the viscoelastic material. However, in this type of coupling, shear is developed only at or near the free edges of the viscoelastic material. As a result, after the length of the device reaches the shear length, damping performance is not improved by further increases in length alone.

The tension-shear coupling characteristics of certain fiber-reinforced materials provide another means of creating structural damping. U.S. Pat. No. 5,203,435 to Dolgin describes a composite damping strut having a viscoelastic material sandwiched between two layers of fiber-reinforced composite material, with the fiber-reinforced layers having opposing orientations. The disclosure of Dolgin claims that the tension-shear coupling for layers of linear fibers at an angle to the load direction can produce tension-twist coupling in a tube, thereby producing shear throughout the viscoelastic layer. In fact, this configuration can produce shear only at and near the edges of the viscoelastic layer. Use of a very low-stiffness viscoelastic material can extend the length of the region in which damping occurs, but at the penalty of a reduction of stiffness of the device. The limitations of this edge effect in composite laminates are well known; see, e.g., R. M. Jones, Mechanics of Composite Materials, Hemisphere Publishing (1975). Moreover, when the strut is clamped at the ends, as would be typical in most applications, the non-elastomeric layers will not displace relative to each other. In this case, shear at the edges is eliminated, drastically reducing the desired vibration-damping characteristics. Dolgin also describes the use of "V-shaped" plies having opposite orientations in the reinforced layers, and claims that this configuration produces shear throughout the viscoelastic layer. In this case, shear will be produced only at and near the edges of the viscoelastic layer and in the vicinity of the vertex of the "V" shape. Finally, Dolgin discloses without explanation or supporting data, in FIG. 8, sine-wave-shaped plies in which the sine waves in the two reinforced layers appear to be 180° out of phase.

SUMMARY OF THE INVENTION

The present invention is directed to a sports racket comprising a frame formed of an energy absorbing structural laminate. The structural laminate comprises: (a) a first layer of composite material comprising $x_1$ plies; wherein $x_1$ is from 1 to 50; and wherein at least $0.5x_1$ plies contain fibers arranged in a shape of a continuous curve; wherein said continuous curve is the same or different in different plies; (b) a second layer of composite material comprising x2 plies; wherein $x_2$ is from 1 to 50; and wherein at least $0.5x_2$ plies contain fibers arranged in a shape of a continuous curve; wherein said continuous curve is the same or different in different plies; and (c) a viscoelastic layer disposed between the first and second layers such that shear strains are substantially distributed throughout the viscoelastic layer when a load is applied to the structural laminate;

provided that no more than $0.75x_1$ plies of said first layer and no more than $0.75x_1$ plies of said second layer contain fibers arranged in a shape of sine curves in which: (i) angular axes in said $0.75x_1$ plies and said $0.75x_2$ plies are substantially parallel to a principal maximum load direction, and wavelengths and amplitudes are substantially equal; (ii) sine curves within said $0.75x_1$ plies are substantially in phase, and sine curves within said $0.75x_2$ plies are substantially in phase; and (iii) a phase difference between said $0.75x_1$ plies and said $0.75x_2$ plies is within about 30° of 180°.

DETAILED DESCRIPTION OF THE INVENTION

The present invention is directed to a sports racket comprising a tubular frame made from an energy absorbing structural laminate comprising alternating layers of fiber composite material and viscoelastic material. In its simplest manifestation, the structural laminate consists of a tube having a wall which has:

(a) a single first layer of composite material containing a set of identical plies in which fibers arranged in the shape of a first continuous curve are embedded in a polymer matrix;

(b) a single second layer of composite material containing a set of identical plies in which fibers arranged in the shape of a second continuous curve are embedded in a polymer matrix; and (c) a single viscoelastic layer disposed between the first and second plies.

Figure 2:
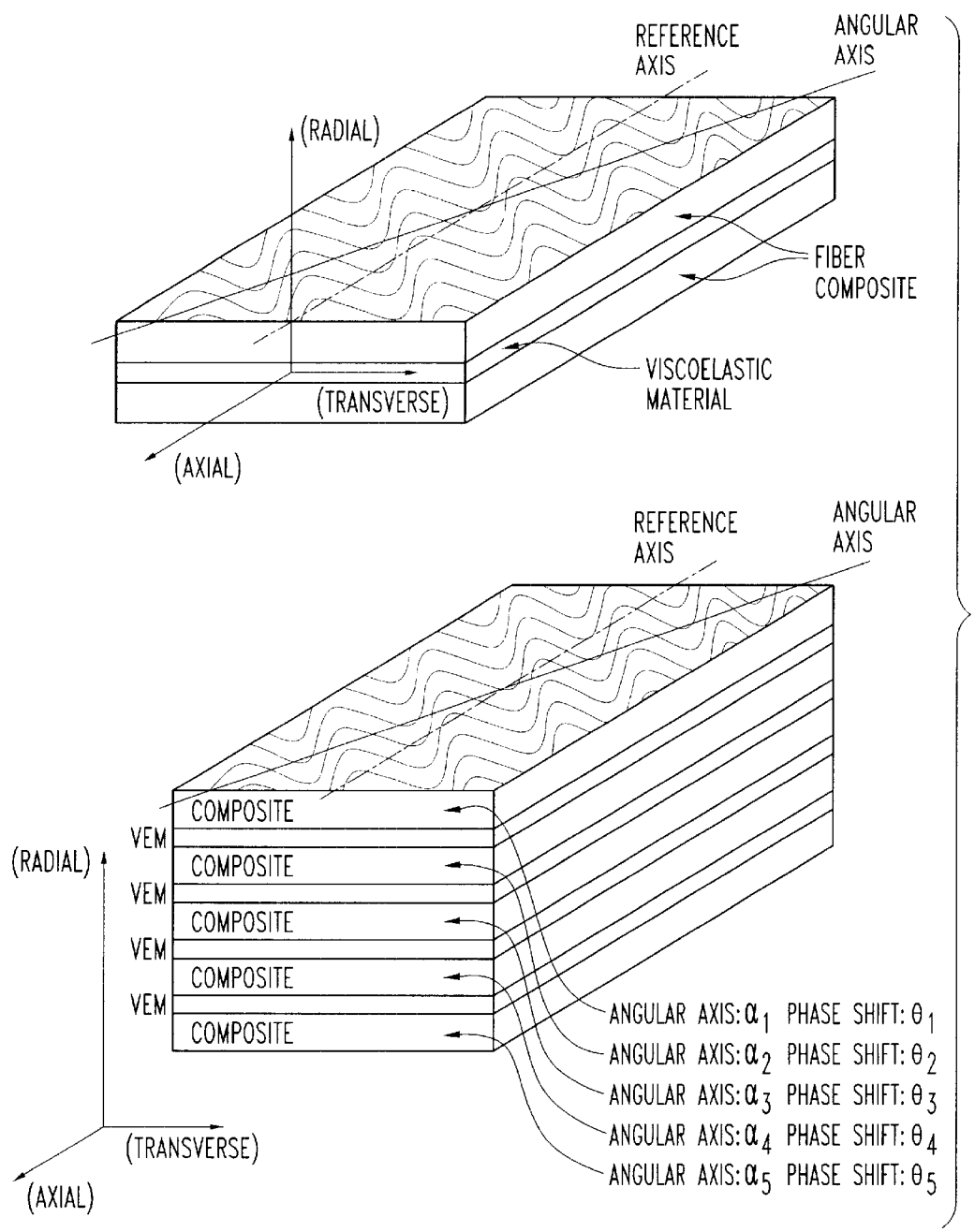
FIG. 2 shows two preferred orientations of the fibers and layers in an embodiment of the claimed invention.

In this basic configuration, which is illustrated in FIG. 2, all of the fibers in each layer have substantially the same shape and are substantially parallel. The reference axis depicted in FIG. 2 is parallel to the principal load direction of the apparatus.

The term "continuous curve," as used herein means a curve defined by a single curved line with no gaps. The first derivative of the continuous curve need not be continuous. Preferably, the fiber curves are periodic functions, e.g., sinusoidal functions or functions comprising sequential circular arcs alternately concave and convex with respect to the angular axis. Preferably, the angle between the maximum slope of the curve and the angular axis is between about 15° and about 60°; in a sinusoidal curve, this angle establishes the relationship between the amplitude and wavelength of the curve. Since the orientation of the fibers in a continuous curve is continuously variable, shear strains will be generated at all points within the viscoelastic layer, rather than only near the edges. Such increased distribution of shear strain leads to improved damping. In the following situations, all three components of the shear strains and stresses are generally present throughout the entire volume of the viscoelastic layer: (1) where the first and second curves are the same periodic curve, although with a phase difference between curves in different plies, or (2) where the first and second curves are the same periodic curve, although with a difference in wavelength, amplitude, or both, between curves in different plies, or (3) where the first and second curves are represented by different mathematical functions, or (4) where the angular axes of the curves in different plies are not parallel. The increased volume of material with non-zero shear strain in these cases leads to improved damping relative to previously known damping structures.

In the more complex manifestations of the present invention, each viscoelastic layer is disposed between a first composite layer which contains $x_1$ plies and a second composite layer which contains $x_2$ plies, wherein each of $x_1$ and $x_2$ varies independently from one to 50, preferably from one to 20, and wherein the individual plies are the same or different. The viscoelastic layers alternate with composite layers to form the energy absorbing structural laminate. Typically, the energy absorbing structural laminate has from one to five layers of viscoelastic material, along with the accompanying composite layers. In structures subjected to bending deformations, it is preferred that there are from two to five layers of viscoelastic material. In such structures, it is preferred that $x_1$ vary from one to 10, and that $x_2$ vary from one to 10, and that the thickness of the viscoelastic layer be less than that of either composite layer.

In one preferred embodiment of the simplest manifestation, at least half of the plies in each composite layer contain fibers in the shape of a continuous curve, as described above. The remaining plies contain straight fibers or no fibers at all. In another preferred embodiment of the invention, all of the plies in each layer contain curved fibers. In another preferred embodiment, the curved fibers in the plies of a particular layer have no more than two angular axis orientations, and at least 75% of the plies in each layer contain curved fibers.

At least half of the plies in each of the first and second layers preferably have fibers having the shape of periodic functions having an amplitude axis and an angular axis. For example, in y=sin(x), the y-axis is the amplitude axis and the x-axis is the angular axis. Continuous periodic functions include but are not limited to sine, cosine, and functions resembling sine and cosine, but comprised of segments of circles, ellipses, or other curves. Preferably, the fibers in the two composite layers are arranged in the shape of a single periodic function, although the amplitude and wavelength of the function describing the fibers in one ply may differ from those in a different ply, even within the same composite layer. Preferably, the amplitude and wavelength of the function are the same for all plies containing fibers arranged in the shape of that function within any one composite layer, and still more preferably, the amplitude and wavelength are the same in plies containing fibers arranged in the shape of that function within both composite layers. Most preferably, all of the plies in both composite layers contain fibers arranged in the shape of the function and the wavelength and amplitude of that function is the same throughout the plies.

When at least $0.5x_1$ plies in the first layer or at least $0.5x_2$ plies in the second layer contain fibers arranged in a shape of a single periodic function, and the angular axes of the function are parallel to each other within each layer, the direction of these parallel angular axes establishes a dominant angular axis for each layer. In a preferred embodiment of the invention, the dominant angular axis in the first layer forms an angle of from 0° to about 80° with the dominant angular axis of the second layer. More preferably, the difference between the orientations of the dominant angular axes is from about 10° to about 40°. Selection of the desirable angle depends on the balance between the desired stiffness and damping of the structural laminate. A smaller angle will provide better stiffness. In one preferred embodiment of the invention, the dominant angular axes of the two layers are not symmetrically disposed about the principal load direction.

The scope of the present invention excludes a structural laminate in which more than 75% of plies in each composite layer contain sine curves that are near 180° out of phase, and which also satisfy several other requirements, as follows. First, the sine curves in both layers have substantially parallel angular axes, which are substantially parallel to the principal maximum load direction, and substantially equal wavelengths and amplitudes. Second, the sine curves in the first layer are substantially in phase with each other, and the sine curves in the second layer are substantially in phase with each other. Finally, the phase difference between the sine curves in the first and second layers is within 30° of 180°. If all four of these limitations are met by an apparatus, it is excluded from the scope of this invention. In other words, the condition imposed is that, if the other limitations are met, then the phase difference between the sine curves in the first and second layers is not within 30° of 180°. When the dominant angular axes of curves in the first and second layers are parallel and the other conditions mentioned above are met, and the curves in the first and second layers are close to being completely out of phase, i.e., a phase difference of 180°, all three shear components will generally not be present. Further, the ability to control all the stiffnesses of the apparatus is limited. In contrast, when fewer than 75% of the plies in either layer contain sine-shaped curves meeting these criteria, the deleterious effect of this out-of-phase relationship is "diluted" and such an apparatus will have desirable properties, and will be within the scope of the present invention. Of course, when at least the product of 0.5 or 0.75 and the number of plies in a layer is required to meet any limitation herein, and this product is not an integer, it is rounded up to the next integer. Preferably, no more than 40% of plies in each composite layer contain sine curves that are near 180° out of phase, and which also satisfy the aforementioned requirements. Most preferably, there exists no pair of plies, one ply from each layer, having sine curves of substantially equal wavelength and amplitude and substantially parallel angular axes, in which the phase difference between the sine curve in the first ply and the sine curve in the second ply is within 30° of 180°.

When the angle between orientations of the dominant angular axes in the two layers approaches zero, the phase shift between curves in the opposing layers is preferably from about one eighth to about one half of the wavelength. Of course, when the curves are sinusoidal, and the other limitations of the proviso stated above are met, the preferred phase shift range is only from about one eighth wave length (i.e., 45°) to about 150°, rather than to one-half wave length (i.e., 180°). In any particular energy absorbing apparatus, the desired phase shift for optimum performance is a function of material properties, geometry and loading conditions.

The fibers are given their curved shape through the use of a textile loom, a fiber or tow placement process, or any of the other fabrication procedures well known in the art of composite materials.

Typically, each of the plies in the present invention is a polymer matrix containing fibers. Suitable polymers include but are not limited to a thermoplastic curing material, e.g., polyether-ether-ketone (PEEK), polypropylene or nylon, or a thermosetting material, e.g., an epoxy polymer, a vinyl ester polymer or a polyimide. Preferred fiber materials are carbon, graphite, glass, KEVLAR® and metals, e.g., steel. The thickness of each of the composite layers preferably is from about 0.005 inches to about 0.050 inches, while that of the viscoelastic layer is preferably from about 0.002 inches to about 0.020 inches. In the simplest configuration, there are two plies surrounding a single layer of viscoelastic material. The preferred thickness for the viscoelastic layer depends on VEM properties and on the composite layer and loading. Characteristically, the thickness of the viscoelastic layer will be less than that of the surrounding layer. The present invention also contemplates multiple alternating layers of composite material, each of which has at least one ply, and viscoelastic material. The energy absorbing structural laminate of this invention is intended for use in any geometric form consistent with the form of a sports racket, preferably a tube.

In a preferred embodiment of the invention in which the fibers have the shape of a periodic function, the ratio of the wavelength of the periodic function to a predetermined structural vibration mode wavelength is less than one.

In an embodiment of the invention, the energy absorbing structural laminate comprises: (a) a first layer of composite material comprising $y_1$ plies; wherein $y_1$ is from 1 to 50; and wherein at least $0.5y_1$ plies contain fibers arranged in a shape of a continuous curve; wherein said continuous curve is the same or different in different plies; (b) a second layer comprising a metallic material, wood, a homogeneous polymeric material not having plies or fibers, or a composite material having $y_2$ plies; wherein $y_2$ is from 1 to 50; and wherein at least $0.75y_2$ plies contain straight fibers; and (c) a viscoelastic layer disposed between the first and second layers such that shear strains are substantially distributed in said viscoelastic layer when a load is applied to the apparatus. In this embodiment, additional viscoelastic layers and additional layers having a majority of curved fibers optionally are present in an alternating fashion. Preferably, there are 2 or 3 viscoelastic layers. Most preferably, there are two viscoelastic layers. Preferably, the metallic material is an alloy of aluminum or titanium. Preferably, the continuous curve is a sinusoidal function. Preferably y, and $y_2$ are from 1 to 20. It is preferred that all of the $y_1$ plies contain curved fibers, and further preferred that at least $0.5y_1$ plies contain identical arrangements of curved fibers and that the remaining plies contain curved fibers having a second angular axis not parallel to that of the at least $0.5y_1$ plies, but are otherwise identical. It is also preferred that all of the $y_2$ plies contain straight fibers. Preferably, when both the first and second layers have at least one ply containing straight fibers, such plies in the first and second layers are not opposing, i.e., they do not have fibers at an angle of +θ relative to the principal load direction in one layer and −θ in the other layer. Preferably, plies containing straight fibers contain a fabric consisting of two sets of straight parallel fibers, the two sets being perpendicular and interwoven so as to form a grid pattern. Preferably, the fabric is aligned within the ply so that one set of fibers is parallel to the principal maximum load direction of the laminate. In one preferred embodiment of the invention, there are two viscoelastic layers and three composite layers, and one of the composite layers contains only straight fibers.

Figure 1:
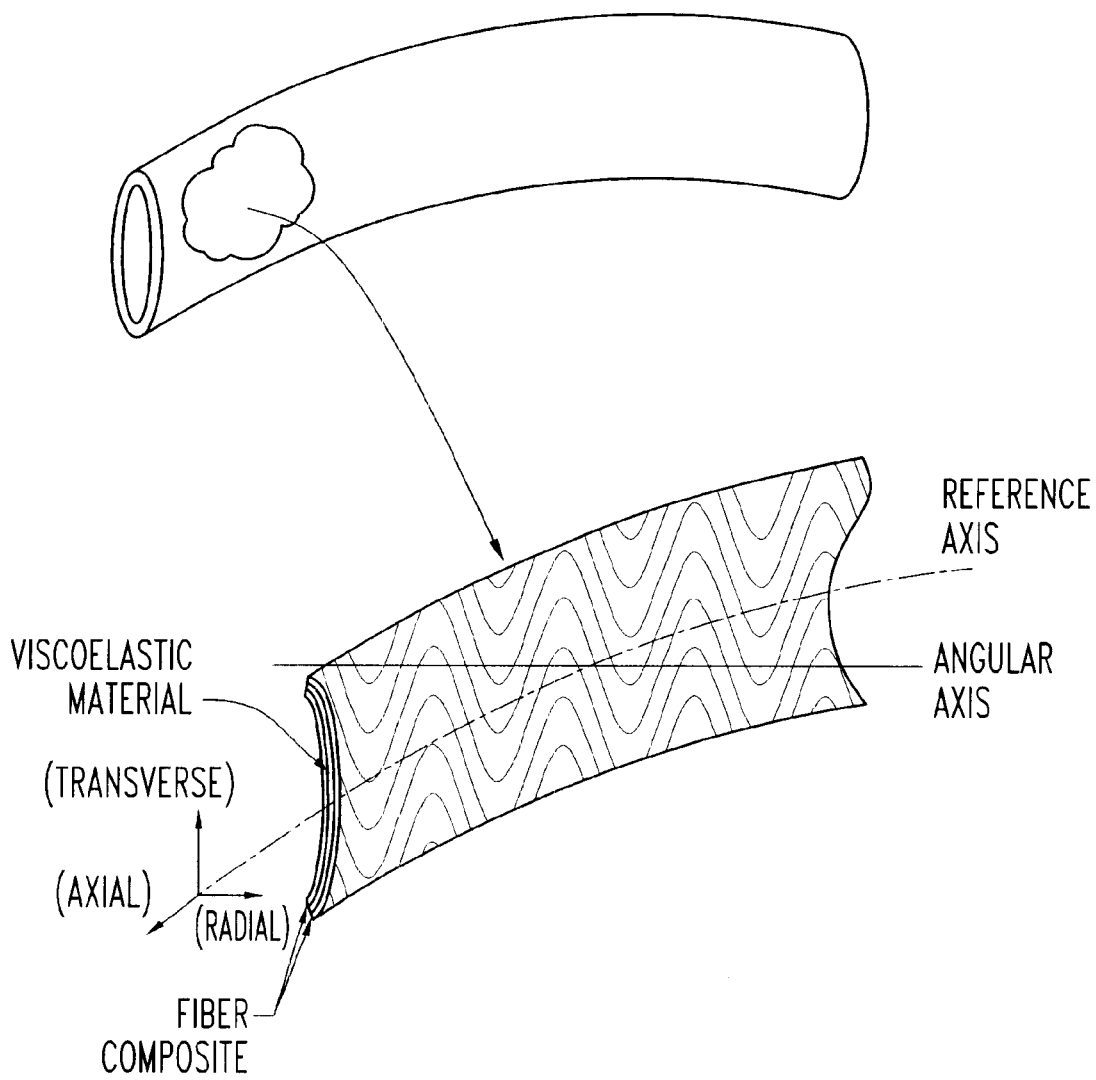
FIG. 1 illustrates a preferred configuration for a section of the sports racket.

The sports racket of this invention is fabricated using standard techniques for producing such rackets from composite materials, as described in U.S. Pat. Nos. 4,983,242 and 5,374,057, the disclosures of which are incorporated herein by reference. A sports racket having any configuration known for composite sports rackets can be made from the energy absorbing structural laminate material disclosed herein. Preferably, an inflatable bladder is used to form a tubular frame in a heated mold, in which case the cross-sectional shape of the frame is determined by the shape of the mold. The preferred cross-sectional shape of the tubular frame is depicted in FIG. 1. Typically, the frame is a continuous member forming the head, throat and handle sections of the racket. The principal maximum loads acting on the frame of a tubular racket are a bending moment in the axial direction and perpendicular shearing loads in the transverse and radial directions. These loads result in a general in-plane combined stress state.

In a preferred embodiment of the invention, no viscoelastic layer is present in those regions of the racket frame which experience lower stress. Omission of the viscoelastic layer from the racket frame in such regions reduces the total weight of the racket without greatly reducing the vibration damping properties of the racket. Preferably, the viscoelastic layer is omitted from about 10% to 40% of the length of the frame, in a region substantially centered about the tip of the racket, i.e., the part of the frame furthest from the handle.

The following Examples are intended solely to illustrate certain preferred embodiments of the invention, and not to limit the invention.

EXAMPLES

Example 1

Deformation of Tubes with Different Phase Relationships

Figure 6:
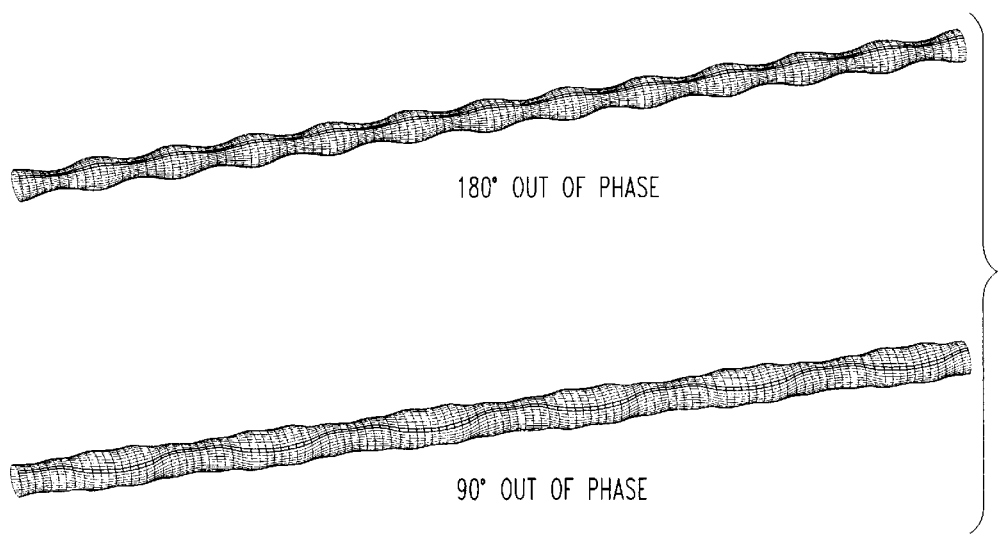
FIG. 6 compares the deformation in the tubular composite shown in FIG. 4 with that of a tubular composite differing only in having a phase difference of one half wavelength (180°).
Figure 7:
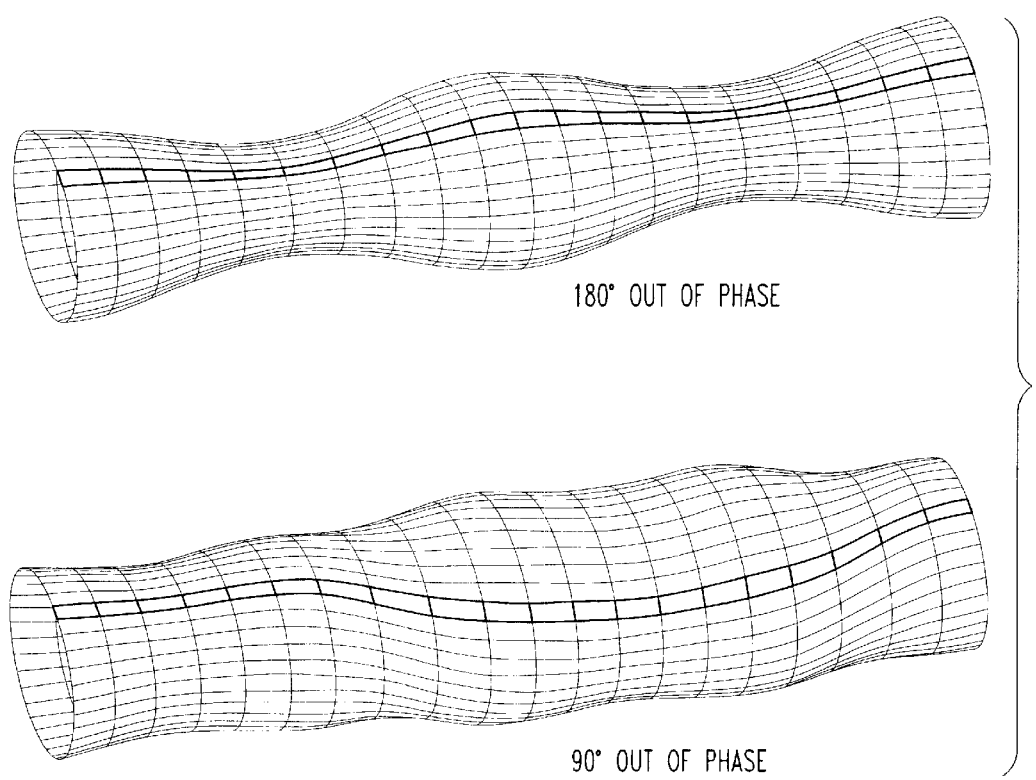
FIG. 7 is an enlarged view of one period of each tube illustrated in FIG. 5.
Figure 8:
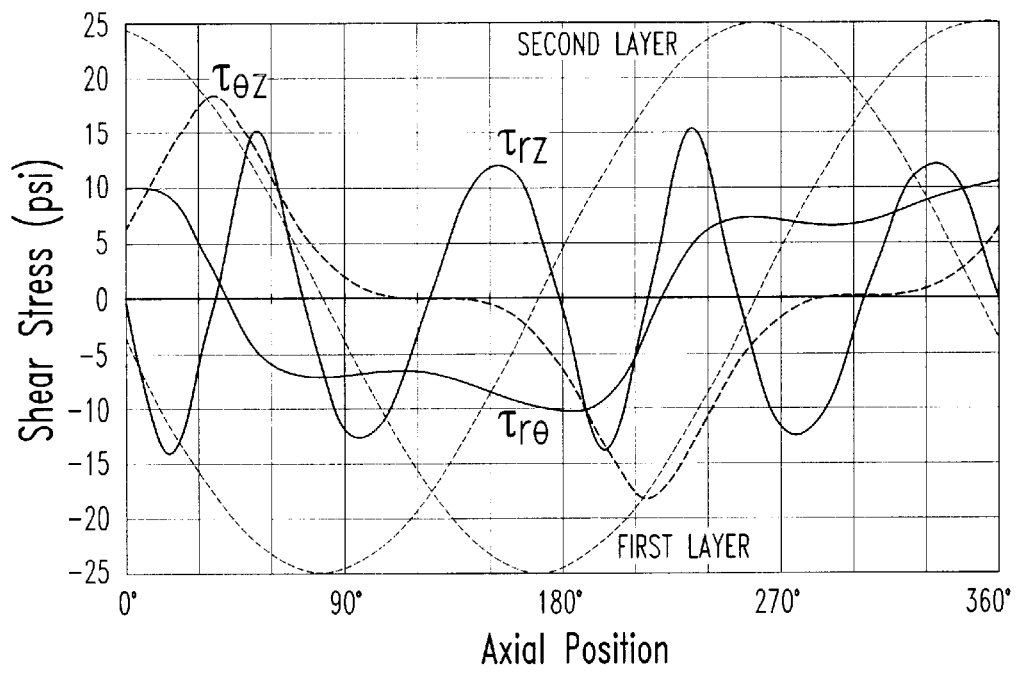
FIG. 8 is a graph showing the shear stresses as a function of axial position for a tubular composite of this invention for the case of parallel angular axes, sine wave fiber patterns and a phase difference of one quarter wavelength (900).
Figure 9:
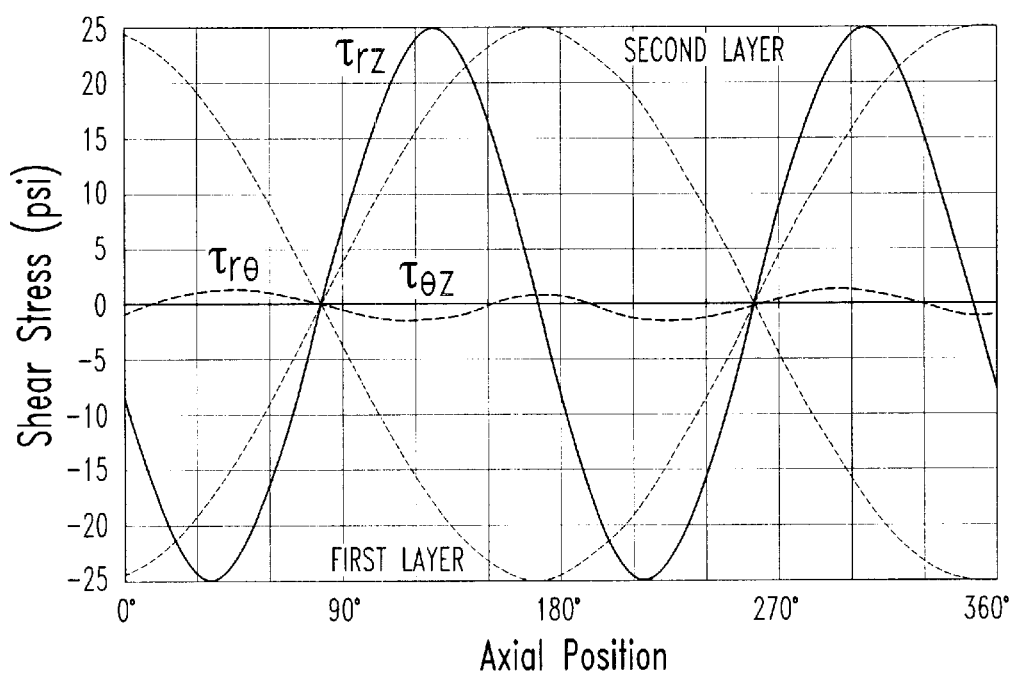
FIG. 9 is a graph showing the shear stresses as a function of axial position for a tube having parallel angular axes, sine wave fiber patterns and a phase difference of one half wavelength (180°).
Figure 10:
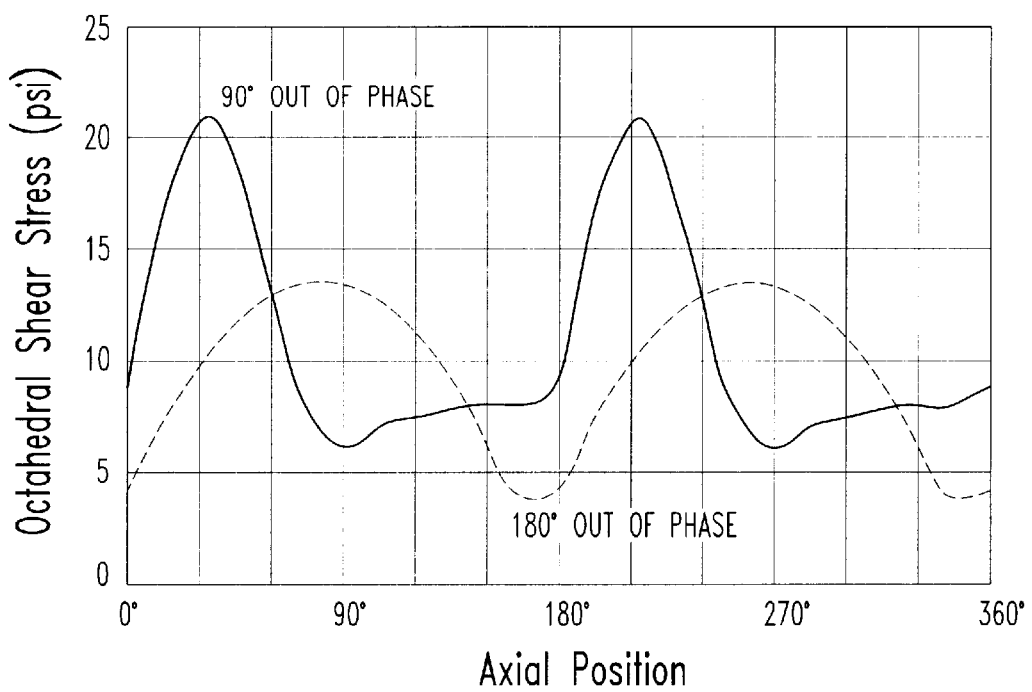
FIG. 10 is a graph showing the octahedral shear stress ($\tau_h$) in the viscoelastic layer as a function of axial position for sine wave fiber patterns and phase differences of 90° and 180°.
Figure 11:
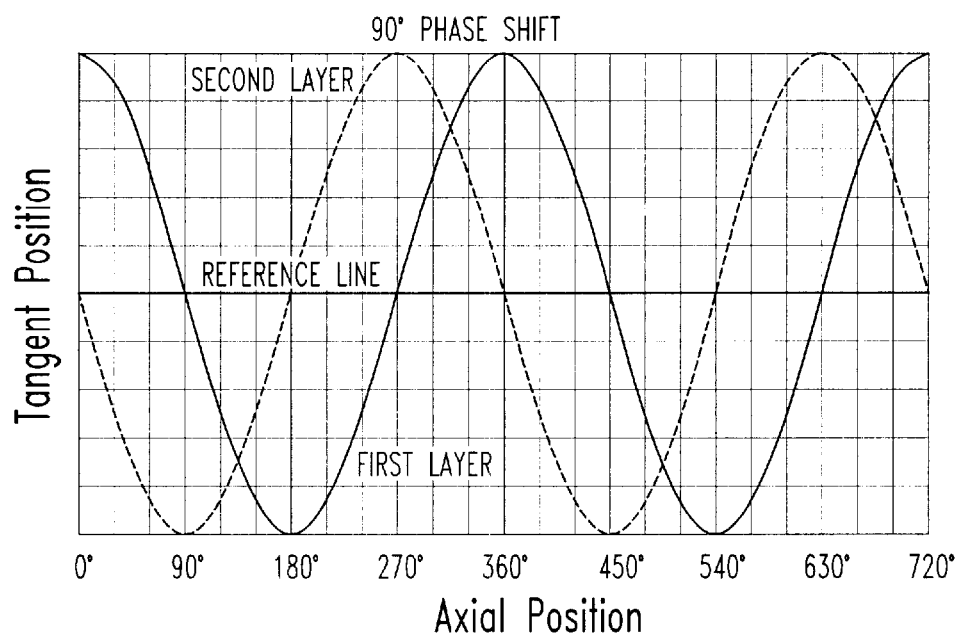
FIG. 11 shows the relative orientation of the fibers in the two composite layers in an embodiment having sine wave fiber patterns with parallel angular axes in the two layers and a phase difference of one quarter wavelength (90°).

A representative configuration was evaluated for a tube of carbon fiber composite based on an epoxy polymer with a viscoelastic material consisting of DYAD 606, a viscoelastic material available in thin sheets from the Soundcoat Corporation. Each of the carbon fiber composite layers surrounding the VEM was 0.008 inches thick. The carbon fiber had the shape of a sine wave with a peak to peak amplitude of 0.6 inches and a period of 3.0 inches. The tangent to the curve at the point where it crossed the angular axis made an angle with the angular axis of 30°. The composite layers on opposite sides of the 0.020 inch thick DYAD 606 viscoelastic material had their angular axes oriented in the load direction, i.e., the axial (z) direction of the tube, and were staggered so that there was a one-quarter wavelength difference at all axial locations, i.e., the first and second layers were 90° out of phase, as shown in FIG. 11. This apparatus had one VEM and two composite layers. The deformed shape of this tube when subjected to an axial force is shown in FIGS. 6 and 7, which compares the deformation pattern for a one-quarter wavelength tube with that of an otherwise identical tube having a one-half wavelength (180°) phase difference. Shear stresses in the quarter- and half-wavelength tubes are shown in FIGS. 8 and 9, respectively, for practical boundary conditions, i.e., the ends of the tube are not allowed to rotate about the tube axis relative to one another but are allowed to displace in the radial direction. FIG. 10 is a comparison of calculated octahedral shear stresses in a layer of VEM for each phase shift, showing that the shear stresses are generally much higher when the plies are 90° out of phase. Since damping is a function of the shear stresses, it is clear that the composite whose plies are 90° out of phase will have improved damping performance.

Example 2

Energy Dissipation in Beams with Different Phase Relationships

Figure 12:
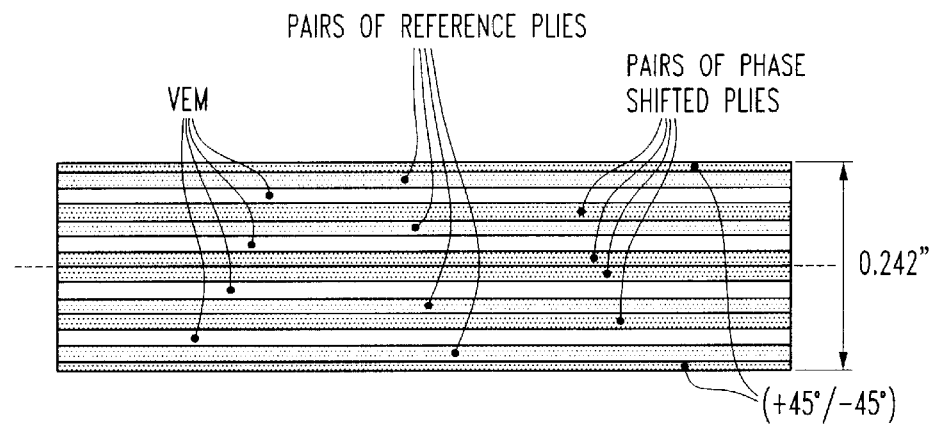
FIG. 12 shows a cross-section of the ply configuration for various beam test specimens.

A second representative configuration of this apparatus was evaluated for a beam-type structural element, shown in cross-section in FIG. 12, constructed of carbon fiber epoxy resin composite and 0.020 inch thick viscoelastic DYAD 606 damping material.

Figure 3:
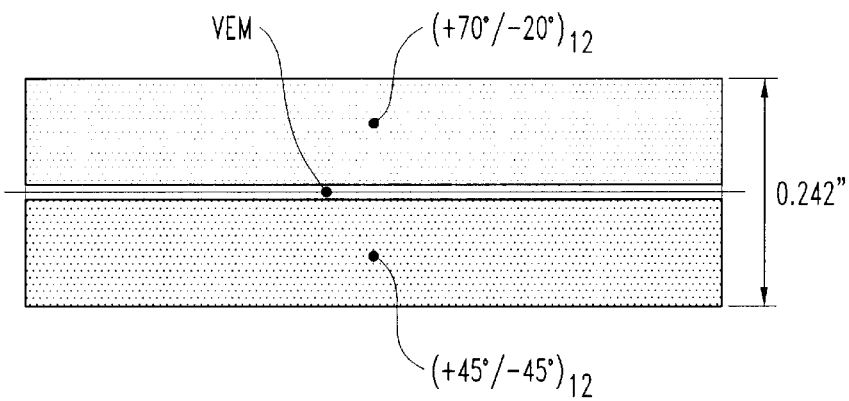
FIG. 3 shows a cross section of the ply configuration for straight fiber beam test specimens.
Figure 4:
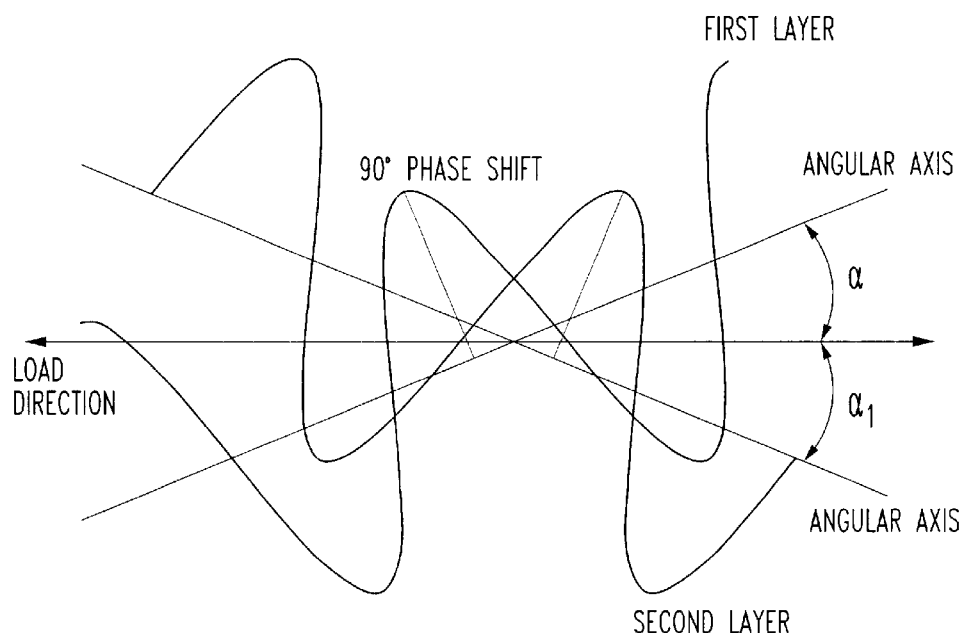
FIG. 4 shows the representative fiber patterns for an embodiment of the invention in which angular axes in the first and second composite layers have equal and opposite orientations.
Figure 5:
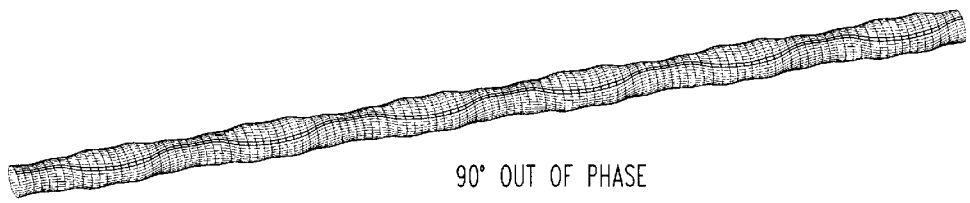
FIG. 5 shows the deformation in a tubular composite according to this invention for the case of parallel angular axes, sine wave fiber patterns and a phase difference of one quarter wavelength (90°).

The overall dimensions of the three beam elements tested were held constant, with only details of the energy dissipating apparatus being varied. The beams contained four layers of viscoelastic material, each of which was sandwiched between layers of composite material having sine wave shaped fibers with a zero degree angular axis, i.e., an angular axis parallel to the long dimension (load direction) of the beam. Each layer of composite material comprises one or more pairs of reference plies, one or more pairs of phase-shifted plies, or a combination thereof, as illustrated in FIG. 12. The pairs of phase-shifted plies contain sine-wave-shaped fibers that are phase-shifted by a fraction of a wavelength relative to those in the pairs of reference plies. In configuration 2A, the phase-shifted plies were shifted so that they were out of phase with the reference plies by one-quarter wavelength at all axial locations. This configuration is shown schematically in FIG. 12. The beams also had surface layers of conventional woven fiber composite material, each surface layer having a thickness of 0.011 inches. In configuration 2B, a phase shift of one-half wavelength was used. In each of these configurations, the carbon fiber plies that surrounded the VEM were 0.009 inches thick and had the shape of a sine wave with a peak-to-peak amplitude of 0.6 inches and a period of 3.0 inches. The tangent to the curve at the point where it crossed the angular axis made an angle with the axis (shown as X—X in FIG. 10) of 30°. Beams fabricated from linear fibers, but possessing the tension-shear and tension-twist coupling energy dissipation modes claimed by others, were designated as configuration 2C. A schematic of this configuration is shown in FIG. 3, where the angles listed are relative to the beam axis X—X, and "$(+70°/-20°)_{12}$" indicates that there is a pair of plies in which the angle relative to the axis is +70° in the first ply of the pair and -20° in the second ply, with the pair repeated 12 times, for a total of 24 plies in that layer.

The purpose of these experiments was two-fold: first, to provide data showing that a VEM disposed between composite layers in which the fibers vary in a periodic curve has greater energy dissipation than if the fibers are straight; and second, to show that a phase shift different from one-half wavelength is preferred for certain applications of the apparatus.

Figure 13:
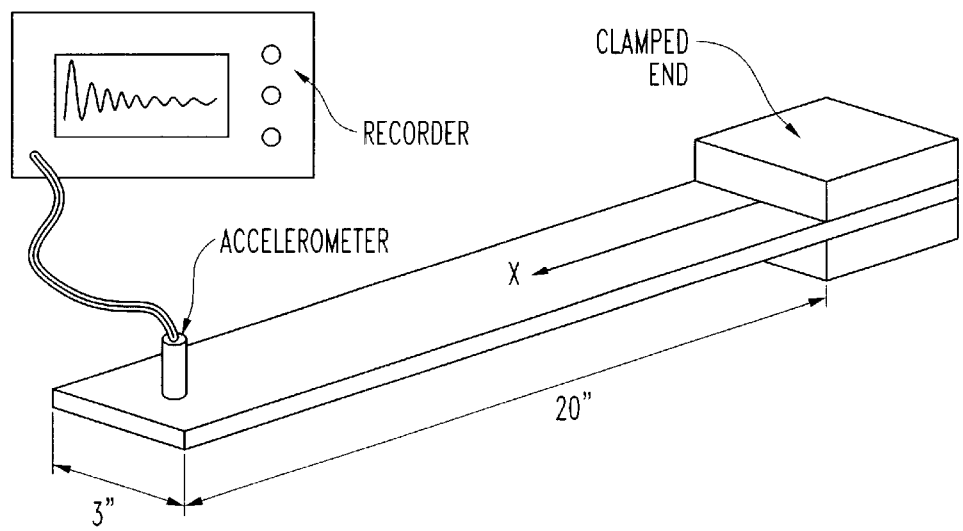
FIG. 13 shows the test orientation for the beam damping tests.

The test configuration, shown in FIG. 13, was a cantilever beam with an accelerometer mounted on the free end. The actual beam specimen length was 24 inches, and 4 inches of length was used to clamp the end. The free end was initially displaced and the end accelerations were recorded. It is assumed that after one or two oscillations the accelerations were due only to the first bending mode. A log-decrement method was used to calculate damping, i.e., energy dissipated, during the first bending mode. In addition, the frequency response function of each beam was recorded. From these data, the modal dampings of the first two modes were calculated using the half-power method. Results of the testing are presented in Table 1. Mode 1 and 2 frequencies ($v$) are presented in hertz, and modal loss factors ($\eta$) as a percentage for each configuration (Conf.) 2A–2C.

TABLE 1

Modal Loss Factor Measurements via the Half-Power Method and the Log Decrement Method (measurements from half-power method in parentheses).

| Conf. | Phase Shift | Total Thickness | Mode 1 ν | Mode 1 η | Mode 2 ν | Mode 2 η |
|---|---|---|---|---|---|---|
| 2A | 90° | 0.242" | 17.1 | 10.9% | 108 | 7.8% |
| 2B | 180° | 0.235" | 17.5 | 8.0% | 110 | 6.5% |
| 2C | N/A | 0.242" | 14.0 | 4.1% (3.4%) | 90 | 2.4% |

The calculations predicted that the apparatus with the phase-shifted plies 90° out of phase with the reference plies (configuration 2A) would have 39% higher damping in the first vibration mode than an otherwise identical apparatus with the phase-shifted plies 1800 out of phase (configuration 2B). Comparison of the measured damping efficiencies for these configurations reveals a 36% increase in efficiency in configuration 2A. Moreover, the experimental results clearly show that an apparatus in which the composite layers surrounding the VEM have a shape of a continuous and periodic curve has greater energy dissipation (as much as 290% for the apparatus tested) than one in which the fibers in the composite layer are straight.

Example 3

Beams Containing Layers with Non-Parallel Axes and Various Phase Relationships

A third representative configuration of this apparatus makes use of non-parallel reference layers. This embodiment was evaluated for the beam-type structural element shown in FIG. 12, again constructed of carbon fiber epoxy resin composite layers and 0.020 inch thick viscoelastic damping material DYAD 606. A schematic diagram of non-parallel reference layers and non-zero phase shift is shown in FIG. 3. The specific configuration studied was α=+20° for the first composite layer and α=−20° for the second composite layer, where a is the angle between the angular axis of the fiber curve and the load direction, or beam axis.

The overall dimensions of the three beam elements tested were held constant, and only the detailed construction of the energy dissipating apparatus was varied. Modal loss factors, A, were computed for the beam first bending mode with a phase shift from 0° to 360°, with all other parameters held constant. Loss factors for the non-parallel reference axis embodiment were normalized to the value calculated for parallel reference layers. While the computed loss factors for the non-parallel reference axis configuration are slightly lower for the first bending mode, there are certain product applications where a moderate change in overall beam stiffness accompanied by a slight damping reduction associated with rotating the reference axes form a more desirable solution. Furthermore, there are clearly biaxial loading applications, e.g., sports rackets, where the biaxial damping offered by the non-parallel reference layer configuration represents the best material solution.

The preceding Examples are intended to describe certain preferred embodiments of the present invention. It should be appreciated, however, that obvious additions and modifications of the invention will be apparent to one skilled in the art. The invention is not limited except as set forth in the claims.

What is claimed is:

1. A sports Racket comprising a frame of an energy absorbing structural laminate, said structural laminate comprising:
   (a) a first layer of composite material comprising $x_1$ plies; wherein $x_1$ is from 1 to 50; and wherein at least $0.5x_1$ plies contain fibers arranged in a shape of a continuous curve; wherein said continuous curve is the same or different in different plies;
   (b) a second layer of composite material comprising $x_2$ plies; wherein $x_2$ is from 1 to 50; and wherein at least $0.5x_2$ plies contain fibers arranged in a shape of a continuous curve; wherein said continuous curve is the same or different in different plies; and
   (c) a viscoelastic layer disposed between the first and second layers such that shear strains are substantially distributed in said viscoelastic layer when a load is applied to the apparatus;
   provided that no more than $0.75x_1$ plies of said first layer and no more than $0.75x_2$ plies of said second layer contain fibers arranged in a shape of sine curves in which: (i) angular axes in said $0.75x_1$ plies and said $0.75x_2$ plies are substantially parallel and wavelengths and amplitudes are substantially equal; (ii) sine curves within said $0.75x_1$ plies are substantially in phase, and sine curves within said $0.75x_2$ plies are substantially in phase; and (iii) a phase difference between said $0.75x_1$ plies and said $0.75x_2$ plies is within about 30° of 180°.

2. The sports racket of claim 1 in which each continuous curve is a periodic function having an amplitude axis and an angular axis.

3. The sports racket of claim 2 in which at least $0.5x_1$ plies in the first layer and at least $0.5x_2$ plies in the second layer contain fibers arranged in a shape of a single periodic function, and the angular axes of said single periodic function within said at least $0.5x_1$ plies in the first layer are parallel and the angular axes of said single periodic function within said at least $0.5x_2$ plies in the second layer are parallel.

4. The sports racket of claim 3 in which an angle between orientations of the angular axes of said single periodic function in said at least $0.5x_1$ plies in the first layer and the angular axes of said single periodic function in said at least $0.5x_2$ plies in the second layer is about 0°.

5. The sports racket of claim 4 in which amplitudes and wavelengths of said single periodic function in said at least $0.5x_1$ plies in the first layer and in said at least $0.5x_2$ plies in the second layer are equal.

6. The sports racket of claim 5 in which a phase difference between said single periodic function in the first layer and said single periodic function in the second layer is from about one eighth wave length to about one half wave length.

7. The sports racket of claim 6 in which said single periodic function is a sinusoidal function.

8. The sports racket of claim 7 in which an angle between a maximum slope of said sinusoidal function and the angular axis of said sinusoidal function in the first and second layers is from about 15° to about 60°.

9. The sports racket of claim 8 in which a ratio of a wavelength of said sinusoidal function to a predetermined structural vibration mode wavelength is less than one.

10. The sports racket of claim 9 containing from 2 to 5 viscoelastic layers.

11. The sports racket of claim 10 in which $x_1$ is from 1 to 10 and $x_2$ is from 1 to 10.

12. The sports racket of claim 11 in which all of the plies contain fibers arranged in a shape of a sinusoidal function.

13. The sports racket of claim 12 in which no viscoelastic layer is present in a region comprising 10% to 40% of the length of the frame, and wherein said region is substantially centered about the tip of the racket.

14. The sports racket of claim 3 in which an angle between orientation of the angular axis of said single periodic function in the first layer and orientation of the angular axis of said single periodic function in the second layer is from about 0° to about 80°.

15. The sports racket of claim 14 in which the angular axis of said single periodic function in the first layer and the angular axis of said single periodic function in the second layer are not symmetrically disposed about a principal load direction of the laminate.

16. The sports racket of claim 15 in which said single periodic function is a sinusoidal function, and in which an angle between a maximum slope of said sinusoidal function and the angular axis of said sinusoidal function in the first and second layers is from about 15° to about 60°.

17. The sports racket of claim 16 in which wavelengths of said single periodic function in said at least $0.5_{x1}$ plies in the first layer and in said at least $0.5x_2$ plies in the second layer are equal; and wherein a ratio of a wavelength of said single periodic function to a predetermined structural vibration mode wavelength is less than one.

18. The sports racket of claim 17 in which an angle between orientation of the angular axis of said single periodic function in the first layer and orientation of the angular axis of said single periodic function in the second layer is from about 10° to about 40°.

19. The sports racket of claim 18 containing from 3 to 5 viscoelastic layers.

20. The sports racket of claim 19 in which $x_1$ is from 1 to 10 and $x_2$ is from 1 to 10.

21. The sports racket of claim 20 in which all of the plies contain fibers arranged in a shape of a single periodic function.

22. The sports racket of claim 21 in which no viscoelastic layer is present in a region comprising 10% to 40% of the length of the frame, and wherein said region is substantially centered about the tip of the racket.

23. A sports racket comprising a frame of an energy absorbing structural laminate, said structural laminate comprising:
   (a) a first layer of composite material comprising $y_1$ plies; wherein $y_1$ is from 1 to 50; and wherein at least $0.5y_1$ plies contain fibers arranged in a shape of a continuous curve; wherein said continuous curve is the same or different in different plies;
   (b) a second layer comprising a metallic material, wood, a homogeneous polymeric material not having plies or fibers, or a composite material having $y_2$ plies; wherein $y_2$ is from 1 to 50; and wherein at least $0.75y_2$ plies contain straight fibers; and
   (c) a viscoelastic layer disposed between the first and second layers such that shear strains are substantially distributed throughout said viscoelastic layer when a load is applied to the structural laminate.

24. The sports racket of claim 23 in which $y_1$ and $y_2$ are from 1 to 20.

25. The sports racket of claim 24 in which said continuous curve is a sinusoidal function.

26. The sports racket of claim 25 containing from 2 to 3 viscoelastic layers.

27. The sports racket of claim 26 in which no viscoelastic layer is present in a region comprising 10% to 40% of the length of the frame, and wherein said region is substantially centered about the tip of the racket.

* * * * *

UNITED STATES PATENT AND TRADEMARK OFFICE
CERTIFICATE OF CORRECTION

PATENT NO.     : 6,416,432 B1
DATED          : July 9, 2002
INVENTOR(S)    : Rosen et al.

It is certified that error appears in the above-identified patent and that said Letters Patent is hereby corrected as shown below:

Column 2,
Line 35, delete "x2" and insert -- $x_2$ -- therefor.
Line 44, delete "$0.75x_1$" and insert -- $0.75x_2$ -- therefor.

Column 3,
Line 12, delete "(900)." and insert -- $(90°)$ -- therefor.

Column 6,
Line 45, delete "Preferably y," and insert -- Preferably $y_1$ -- therefor.

Column 9,
Line 18, delete "1800" and insert -- $180°$ -- therefor.
Line 48, delete "A" and insert -- ŋ -- therefor.

Column 10,
Line 2, delete "Racket" and insert -- racket -- therefor.

Signed and Sealed this

Twenty-first Day of January, 2003

JAMES E. ROGAN
*Director of the United States Patent and Trademark Office*